United States Patent [19]

Lee, Jr.

[11] 3,911,881

[45] Oct. 14, 1975

[54] COMBINED ENGINE EXHAUST AND FUEL GASIFICATION SYSTEM FOR AN INTERNAL COMBUSTION ENGINE

[76] Inventor: Seth Lee, Jr., Rte. 1, Coats, N.C. 27521

[22] Filed: Aug. 31, 1973

[21] Appl. No.: 393,629

[52] U.S. Cl. ... 123/122 AB; 123/122 A; 123/122 H; 123/122 AC; 123/133; 60/278; 165/52
[51] Int. Cl.² ........................................ F02M 31/00
[58] Field of Search... 123/122 AB, 122 A, 122 AC, 123/122 H, 133, 119 A; 165/52; 60/278, 298

[56] References Cited
UNITED STATES PATENTS

| | | | |
|---|---|---|---|
| 1,325,850 | 12/1910 | Humphreys | 165/52 |
| 1,341,141 | 5/1920 | Jennon | 123/133 |
| 1,464,759 | 8/1923 | Francis | 123/122 H |
| 1,945,178 | 1/1938 | Carter | 123/122 H |
| 1,980,496 | 11/1934 | Musselwhite | 123/133 |
| 2,269,930 | 1/1942 | Ericson | 123/122 H |
| 2,312,151 | 2/1943 | Crabtree | 123/133 |
| 2,370,261 | 2/1945 | Roumillet | 123/133 |
| 3,032,023 | 5/1962 | Kruger | 123/122 A |
| 3,059,422 | 10/1962 | White | 60/298 |
| 3,667,436 | 6/1972 | Reichhelm | 123/133 |
| 3,754,398 | 8/1973 | Mattavi | 60/298 |
| 3,788,292 | 1/1974 | Lee | 123/122 AB |
| 3,796,255 | 3/1974 | Streitz | 123/122 |

FOREIGN PATENTS OR APPLICATIONS 864,775   8/1968   Canada .............................. 60/298

Primary Examiner—Charles J. Myhre
Assistant Examiner—R. H. Lazarus
Attorney, Agent, or Firm—J. Gibson Semmes

[57] ABSTRACT

A system for gasifying a mixture of fuel vapor and air for induction into an internal combustion engine comprising means for heating the mixture to gasification temperature within an inlet manifold chamber heated externally by engine exhaust; and optionally including means for adding air and hot exhaust to the gasified mixture prior to induction into the engine; means for adding air to the exhaust gases leaving the engine and auxiliary burning means for igniting combustibles in the exhaust gases. Through the present system the mileage per gallon of fuel will be increased at least 20% over the conventional norm.

12 Claims, 3 Drawing Figures

COMBINED ENGINE EXHAUST AND FUEL GASIFICATION SYSTEM FOR AN INTERNAL COMBUSTION ENGINE

CROSS REFERENCE TO RELATED APPLICATIONS

This invention is an improvement over the invention disclosed in my application Ser. No. 188,726, now abandoned, and my copending application Ser. No. 295,243, now U.S. Pat. No. 3,788,792.

FIELD OF THE INVENTION

This invention relates to intake and exhaust systems for internal combustion engines in which some or all of the fuel and air mixture is heated by some or all of the exhaust gases from the engine. It is also related to systems for scavenging unburned material from exhaust gases. This system has been found to be universally adaptable to essentially all gas or other fuel consuming engines, regardless of the use to which they may be put.

DESCRIPTION OF THE PRIOR ART

Engine designers have recognized for many years the value of using the exhaust system of the engine to heat the fuel mixture fed to the same engine. Goodspeed and Westendarp disclose in U.S. Pat. Nos. 857,730 and 858,046 early examples of systems in which the raw fuel is pumped through a heat exchanger coil around which the exhaust gases from the engine are directed, to vaporize the fuel which is subsequently inducted into the engine with an appropriate amount of air. Morse teaches in U.S. Pat. No. 961,152 that mixing small amounts of air in the raw fuel which is heated by the exhaust gases is desirable to prevent the engine from drawing in too much raw fuel for separate mixture with air. Dixon and Coffman show in U.S. Pat. Nos. 1,148,892 and 1,267,185 some later developments for heating the raw fuel prior to carburetion. Giddens teaches in U.S. Pat. No. 1,218,545 that it may be desirable to warm the air and fuel separately before they are mixed for combustion. Good's U.S. Pat. No. 1,253,682 shows an early system in which the fuel and air mixture is heated by the engine exhaust in a simple countercurrent heat exchanger.

Church shows in U.S. Pat. No. 1,415,086 an intake system in which all of the fuel and air mixture is passed through a heat exchanger warmed by the engine exhaust during engine warmup; however, the mixture is subsequently bypassed around the heat exchanger when the engine is warm. Fornaca shows an intake system in U.S. Pat. No. 1,660,609 which permits the fuel and air mixture to pass through either or both of two parallel intake paths, one of which is heated by the exhaust along more of its length than the other. The Wirrer device of U.S. Pat. No. 1,605,382 teaches the use of a heat exchanger in which a small portion of the exhaust gases is fed back to the intake to be mixed with and to warm the incoming fuel and air mixture.

Primakoff shows a recent intake and exhaust manifold in U.S. Pat. No. 2,836,161 in which the fuel and air mixture is drawn into a first expansion chamber, then into a second chamber where it contacts the exhaust manifold and finally into the engine. Reichhelm's U.S. Pat. No. 3,667,436 teaches the mixing of fuel, air and exhaust in a chamber heated by the exhaust, the mixture subsequently being mixed with an additional quantity of air and exhaust gases prior to induction into the engine.

SUMMARY OF THE INVENTION

A chamber for gasifying fuel vapor in an air and fuel mixture is heated by contact with a baffled chamber for exhaust from an engine. A unique arrangement of baffles in the baffled chamber ensures temperature in the gasifying chamber adequate for gasifying the fuel vapor. Provisions for exhaust feedback to the gasifying chamber, air injection into the exhaust flow and auxiliary burning in the exhaust header ensure low pollution operation substantially in keeping with 1975 Federal standards.

DESCRIPTION OF THE PREFERRED EMBODIMENT

Figure 1:
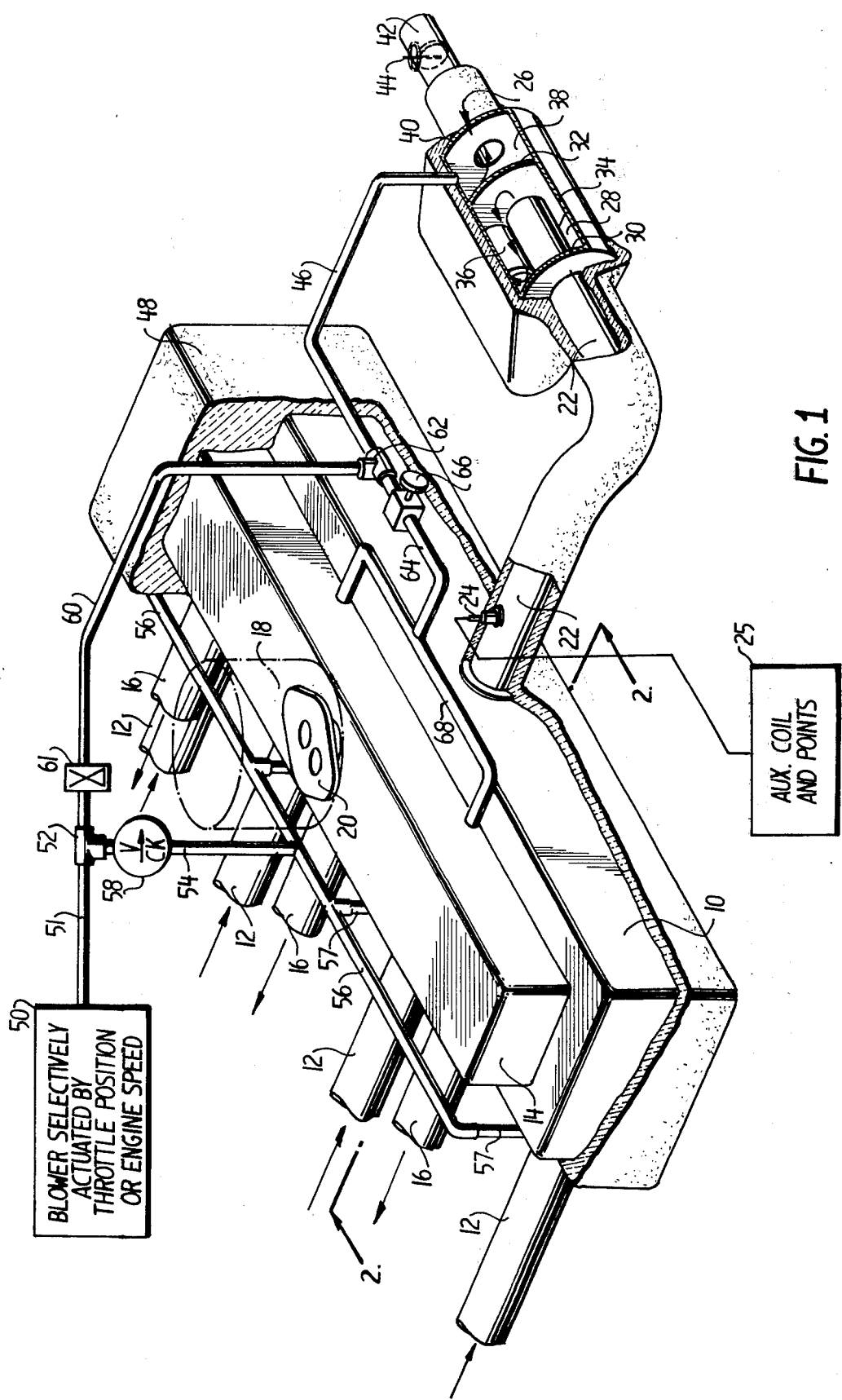
FIG. 1 is a perspective view, partially in section, of the assembled apparatus of the invention.

There follows a detailed description of the preferred embodiment of the apparatus of the invention, reference being had to the drawings in which like reference numerals denote like elements of structure in each of the several FIGURES.

FIG. 1 shows a perspective view of the invention, partially in section. An elongated exhaust baffle and heat exchanger chamber 10 is connected to the exhaust ports of an internal combustion engine (not shown) via conduits 12. The embodiment shown is suited for use with an in-line engine having four exhaust ports and three inlet ports; however, it should be understood that the invention may be readily adapted for use on engines having different block configurations and numbers of exhaust and inlet ports. Situated above and pneumatically isolated from chamber 10 is an elongated fuel and air gasification chamber 14, connected to the inlet ports of the engine by conduits 16 and to a conventional carburetor 18, shown in phantom, by manifold flange 20. Exhaust header 22, which includes an auxiliary spark plug 24 installed in the wall thereof, directs the flow of exhaust gases from chamber 10 to resonator or muffler 26. Plug 24 is fired by an auxiliary coil and set of points, shown schematically at 25. Muffler 26 comprises a first enclosed volume 28 bounded by end wall 30, baffle 32 and outer shell 34. Header 22 extends through end wall 30 into proximity to baffle 32. Pipe 36 extends from proximity to end wall 30 through baffle 32, providing a flow path into a second enclosed volume 38 bounded by baffle 32, end wall 40 and outer shell 34. Tail pipe 42 extends through end wall 40, providing a flow path to ambient or any additional silencing equipment that may be desired. Located in tail pipe 42 is a thermally actuated or thermostatic valve 44, which substantially closes at low temperatures and opens as the exhaust heats up. Extending into chamber 38 is exhaust feedback pipe 46. The functions of valve 44 and pipe 46 are discussed below. A blanket of thermal insulation 48, such as TEM-MAT, covers chambers 10 and 14, header 22 and resonator 26 to minimize heat losses.

Continuing with reference to FIG. 1, blower 50, which may be set to actuate in accordance with engine speed or throttle position through the use of well known speed and position sensing mechanisms, provides a flow of air to pipe 51 which is connected through one leg of "T" 52 to pipe 54 and air injection header 56 via pipes 57 which are connected to each of conduits 12 outside chamber 10. Check valve 58 in pipe 54 prevents flow of exhaust gases out from conduits 12 to "T" 52 and blower 50. The other leg of "T" 52 is connected to pipe 60, which includes a solenoid valve 61 which is set to open in response to engine speed or throttle position simultaneously with the blower 50, and prevents air from being drawn through blower 50 when the blower is not in use. Pipe 60 and exhaust feedback pipe 46 are joined at "T" 62, the other leg of which is connected to pipe 64, which includes manually adjustable valve 66. Pipe 64 is connected to air and exhaust injection header 68 which is connected through the side walls of chamber 14 on either side of manifold flange 20, as shown.

Figure 2:
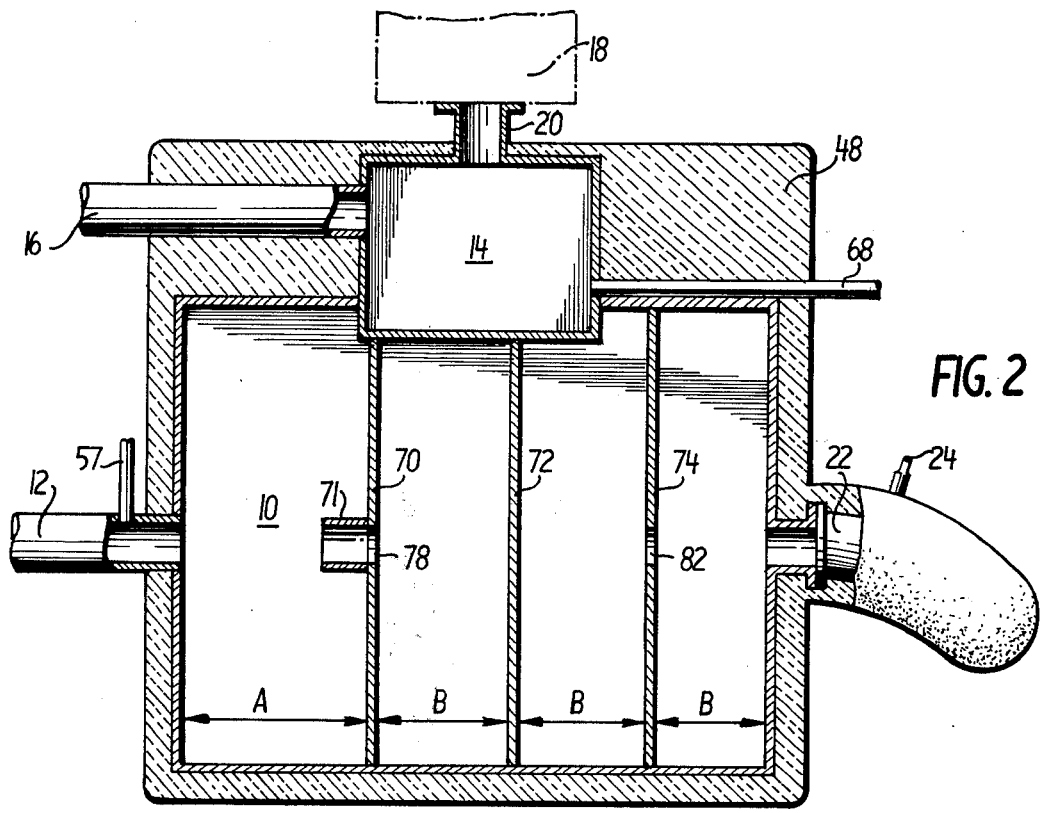
FIG. 2 is section through the apparatus of the invention taken along the section line 2—2 of FIG. 1.

FIG. 2 shows a section taken along line 2—2 of FIG. 1, conduits 12 and 16 and header 22 having been moved slightly into section for clarity. Chambers 10 and 14 are essentially rectangular in cross section and extend approximately the length of the engine. Any material having good thermal conductivity and resistance to the high temperatures generated in the device may be used for the walk of the chambers; for example, carbon steel weldments have been used with success. Chamber 10 is broken into four smaller chambers by vertically arranged baffle plates 70, 72 and 74 which extend the entire length of the chamber 10 and serve to direct the flow of the exhaust gases therethrough, transfer heat effectively to chamber 14 and to some extent muffle engine exhaust noise. Baffles 70, 72 and 74, include staggered openings therethrough as will be discussed with regard to FIG. 3. The openings in baffle 70 are surrounded on the upstream side by short baffle tubes 71. The spacing A of baffle 70 from the inlets of conduits 12 is approximately twice the spacing B between 70 and 72; 72 and 74; and 74 and the outlet to header 22. This arrangement of the baffles permits a significant expansion of the exhaust gases upon entry into chamber 10, thereby minimizing undesirable back pressure on the engine, while impeding the flow of exhaust gases sufficiently to ensure adequate heat transfer to chamber 14.

As indicated in FIG. 2, chamber 14 is considerably smaller than chamber 10 and is nested partially within chamber 10 approximately above baffles 70 and 72, to facilitate heat transfer to chamber 14. Conduits 16 enter chamber 14 near the upper surface thereof at a point insulated from direct contact with the heated walls of inlet section of chamber 10 to minimize chances of overheating the gasified mixture to a potentially dangerous temperature as it is drawn into the engine. Air and exhaust injection header 68 enters chamber 14 in at least two symmetrically spaced locations. In contrast to the location of conduits 16, header 68 enters chamber 14 at a point in direct contact with the heated walls of the outlet section of chamber 10, to optimize the heating of the air and exhaust gas mixture.

Figure 3:
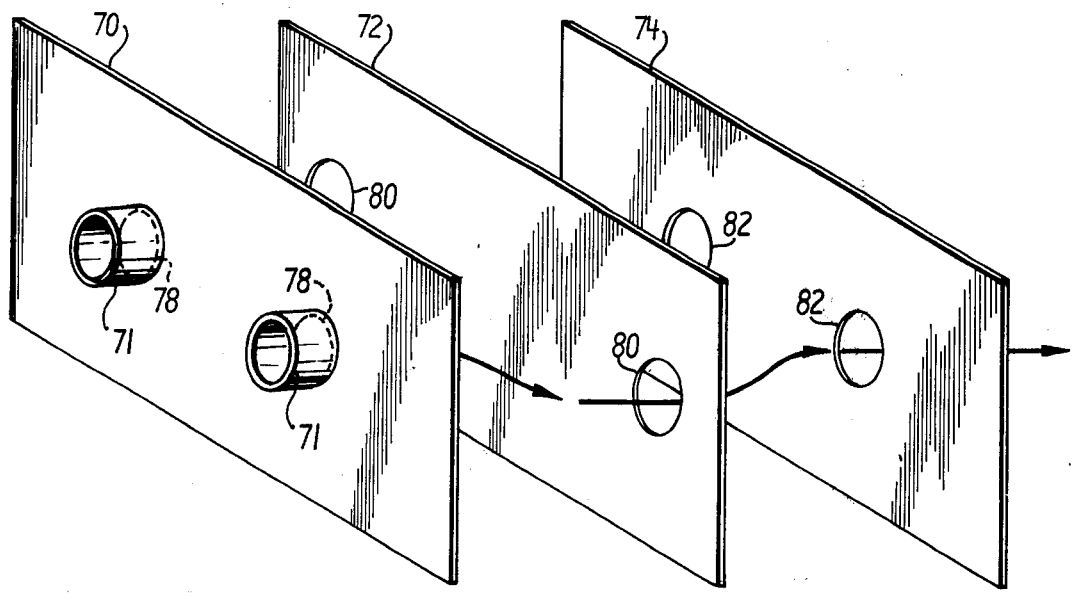
FIG. 3 is a perspective view of the baffle plates shown in section in FIG. 2, indicating the location of the flow passages.

FIG. 3 shows a perspective view of baffles 70, 72 and 74, indicating the flow path of the exhaust gases and the location of the flow passages. In the embodiment for use with an engine having four exhaust ports, baffle 70 includes ports 78 located toward the center of the baffle in approximate alignment with the two central exhaust ports. Baffle tubes 71 around ports 78 tend to restrict flow therethrough by causing additional turbulence upstream of baffle 70, which slows flow through the system and optimizes heat transfer. Baffle 72 includes ports 80 located toward the ends of the baffle in approximate alignment with the two end exhaust ports. Baffle 74 includes ports 82 located similarly to those of baffle 70. Other arrangements of baffles and ports may occur to one of ordinary skill in the art, the primary consideration being to provide a rather long flow path for the bases to optimize the heating of chamber 14; however, this arrangement has been found to produce excellent performance.

In operation, the apparatus of this invention produces reduced exhaust pollution compared to conventional internal combustion engines and will operate satisfactorily on gasoline, kerosene, light fuel oil or Diesel oil. The device provides elevated temperatures in chamber 14 which actually gasify the fuel vapor in the mixture coming from carburetor 18, thus producing a completely gaseous fuel which burns much like liquified petroleum gas in the engine. Kerosene, light fuel oil or Diesel fuel will gasify at temperatures above 580°F.; and gasoline, in the range from 610° to 640°F. These gasified mixtures do not tend to condense in the inlet of the engine and thus do not contribute to dilution of the crankcase oil which often occurs in conventional engines.

Assuming that the engine is cold when started, the invention functions essentially as follows. Temperature valve 44 will have closed somewhat thus forcing additional exhaust gases into pipe 46 at least during this warm-up period. At "T" 62, the exhaust gases are mixed with any air coming through pipe 60 and metered into header 68 in accordance with the setting of valve 66. The exhaust gas and air mixture is heated by contact with chamber 10 and drawn into chamber 14 where it mixes with the fuel and air flowing from carburetor 18. This helps heat the fuel vapor to the gasification temperature which is achieved as the steel walls of chamber 14 are heated by the exhaust gases flowing through chamber 10, and also permits at least a portion of any combustibles in the exhaust gases to be recycled to the engine for burning. At low engine speeds generally and especially during warm-up, an internal combustion engine operates at a low efficiency level, resulting in fuel wastage and excess pollution in the exhaust. To alleviate this condition, blower 50 is actuated by the throttle position or engine speed to add air to the exhaust gas feedback to chamber 14 and to inject air into the exhaust manifold of the engine before the exhaust gases enter chamber 10. The air added to chamber 14 tends to lean out the mixture slightly at low speeds, contributing to more efficient burning.

The air added to the exhaust gases at the inlet of chamber 10 serves to promote additional combustion of unburned fuel, thereby minimizing pollution and optimizing the heat transfer in chamber 10. Exhaust gases enter chamber 10, expand therein into contact with baffle 70 and are forced on through ports 78; expand into contact with baffle 72 and through ports 80; expand into contact with baffle 74 and through ports 82; and expand once more before leaving chamber 10 via header 22. Spark plug 24 serves to promote combustion of any remaining unburned fuel or other combustibles, after which the gases flow through muffler 26 and out tailpipe 42 to ambient. After the engine has warmed up, valve 44 opens to permit free flow of exhaust gases. Blower 50 cuts out automatically at a preselected engine speed of throttle position where engine efficiency is such that undue pollution does not result.

Due to the extensive thermal contact of the exhaust gases with chamber 14, the extreme temperature levels required to gasify the fuel vapor from the carburetor are attained, as previously discussed. In the gasoline system, the optimum temperature for gasification is approximately 624°F., at which point the exhaust gases contain the lowest percentages of carbon monoxide, hydrocarbons, carbon dioxide and nitrogen oxide gases. In practice, the temperature of chamber 10 may be checked during tuning and the settings of carburetor 18, valve 66 and valve 44 adjusted as necessary to promote optimum operating conditions over the entire operating range of the engine.

The performance of the invention has been most satisfactory, with the 1975 Federal emission standards being substantially met on a 1962, standard shift six-cylinder automobile modified in accordance with the teachings herein. In tests conducted by General Environments Corporation of Springfield, VA. in July of 1973, the experimental vehicle performed as follows:

| | |
|---|---|
| TOTAL HYDROCARBONS | 0.95 gm/mi |
| CARBON MONOXIDE | 2.55 gm/mi |
| NITROGEN OXIDE | 1.77 gm/mi |

This compares quite favorably with the Federal Government Standards, as follows:

| | |
|---|---|
| 1973-74 Standard - CVS-1 Cycle | |
| TOTAL HYDROCARBONS | 3.4 gm/mi |
| CARBON MONOXIDE | 39.0 gm/mi |
| NITROGEN OXIDE | 3.4 gm/mi |
| 1975 Standard - CVS-3 Cycle | |
| TOTAL HYDROCARBONS | 0.41 gm/mi |
| CARBON MONOXIDE | 3.4 gm/mi |
| NITROGEN OXIDE | 3.10 gm/mi |

It should be noted that while low grade fuels may be used at temperatures in chamber 14 which are less than 580°F., maximum emission standards for carbon monoxide cannot generally be achieved. During the period of initial start up at very low temperatures, the low grade fuels cannot be used; however, in these temperature ranges, it has been found that bottled liquified petroleum gases may be used during the warm up period. In practice, a fuel switching valve could be installed in the system responsive to the heat of the engine which would switch from bottled gas to low grade liquid at the appropriate temperature.

Having described my invention in such detail as to enable one of ordinary skill in the art to make and use it, I claim:

1. A combined engine exhaust and fuel gasification system for an internal combustion engine comprising:
   A. a first elongated chamber of thermally conductive material having inlet means for admitting a fuel and air mixture and outlet means for transmitting the mixture to the engine;
   B. a second elongated chamber of thermally conductive material, the second chamber being longer than the first chamber and at least partially receiving the first chamber and having a common wall portion therewith disposed centrally and near the top of the second chamber, the second chamber further having inlet means for admitting exhaust gases from the engine and outlet means for transmitting the exhaust gases from the second chamber; and
   C. a plurality of spaced baffle plates, each of the baffle plates extending entirely across the length of said second chamber and defining a plurality of apertures, the apertures defined by each baffle plate being unaligned with respect to the apertures defined by the adjacently located other baffle plates, the exhaust gases flowing from the inlet means to the outlet means through the apertures defined by said plurality of baffle plates to provide effective heat transfer to the first elongated chamber and muffle engine exhaust noise.

2. The system of claim 1, wherein the outlet means from the second chamber comprises an exhaust header pipe connected to an opening in the second chamber, a muffler connected to the exhaust header pipe and a thermostatic valve means for substantially blocking flow through the muffler at low temperatures and permitting flow as the engine exhaust temperature increases.

3. The system of claim 1, further including:
   D. means connected to the outlet means of the second chamber and to the first chamber for introducing a mixture of air and exhaust gases into the first chamber.

4. The system of claim 3, wherein the means for introducing the mixture of air and exhaust gases is selectively actuable by a means sensitive to throttle position.

5. The system of claim 3, wherein the means for introducing the mixture of air and exhaust gases is selectively actuable by a means sensitive to engine speed.

6. The system of claim 1, further including:
   D. means connected to the inlet means of the second chamber for introducing air into the exhaust gases entering the second chamber.

7. The system of claim 6, wherein the means for introducing the air is selectively actuable by a means sensitive to throttle position.

8. The system of claim 6, wherein the means for introducing the air is selectively actuable by a means sensitive to engine speed.

9. The system of claim 1, wherein the second chamber is divided into a plurality of separate smaller chambers by the baffle plates.

10. The system of claim 9, wherein the second chamber has a horizontal dimension between its inlet and outlet means and wherein the baffle plates are three in number and divide the second chamber into a first small volume adjacent the inlet means and three other smaller volumes, each of the three smaller volumes being approximately half the size of the first small volume.

11. The system of claim 1, wherein the outlet means from the second chamber comprises an exhaust header pipe connected to an opening centrally disposed in the second chamber, a muffler connected to the exhaust header pipe and a thermostatic valve means for substantially blocking flow through the muffler at low temperatures and permitting flow as the engine exhaust temperature increases.

12. The system of claim 1 wherein the first baffle plate in the exhaust gas flow comprises baffle tubes positioned around its apertures to restrict exhaust gas flow therethrough by causing additional turbulence upstream of the first baffle plate to optimize heat transfer to the first elongated chamber

* * * * *